United States Patent [19]
Miyamoto et al.

[11] Patent Number: 5,506,076
[45] Date of Patent: Apr. 9, 1996

[54] ALKALI SECONDARY BATTERY

[75] Inventors: Kunihiko Miyamoto; Takeshi Fukuju; Ken Sugimoto, all of Tokyo, Japan

[73] Assignee: Toshiba Battery Co., Ltd., Tokyo, Japan

[21] Appl. No.: 268,956

[22] Filed: Jun. 30, 1994

[30] Foreign Application Priority Data

Jun. 30, 1993 [JP] Japan .................................. 5-161573

[51] Int. Cl.$^6$ ........................................................ H01M 4/52
[52] U.S. Cl. ........................... 429/223; 429/232; 429/220
[58] Field of Search ................................... 429/223, 232, 429/220; H01M 4/52

[56] References Cited

U.S. PATENT DOCUMENTS

| | | | |
|---|---|---|---|
| 4,935,318 | 6/1990 | Ikoma et al. | 429/206 |
| 4,985,318 | 1/1991 | Oshitani et al. | 429/223 |
| 5,219,678 | 6/1993 | Hasabe et al. | 429/59 |

FOREIGN PATENT DOCUMENTS

| | | |
|---|---|---|
| 2-30061 | 1/1991 | Japan . |
| 4179056 | 6/1992 | Japan . |
| 5-21064 | 1/1993 | Japan . |
| 5-182663 | 7/1993 | Japan . |
| 6-5279 | 1/1994 | Japan . |
| 6103973 | 4/1994 | Japan . |

OTHER PUBLICATIONS

Japanese Koka; 57–157464, Sep. 29, 1982, Pressed Nickel Electrode for Storage Battery; Shiyougo Suzuki.
Japanese Koka: 05–47379, Feb. 26, 1993, Nickel Hydroxide Electrode for Alkaline Secondary Battery; Harvo Sawa.

*Primary Examiner*—Prince Willis, Jr.
*Assistant Examiner*—Richard H. Lilley, Jr.
*Attorney, Agent, or Firm*—Oblon, Spivak, McClelland, Maier & Neustadt

[57] ABSTRACT

This invention discloses an alkali secondary battery which includes a cadmium-free positive electrode whose swelling ratio is decreased, and in which the cycle characteristic is improved and the charge efficiency in use at high temperatures is also improved. This alkali secondary battery includes a positive electrode accommodated in a case and having a structure in which a paste containing nickel hydroxide grains, a conductor, and a binder is filled in a metal porous body, a negative electrode accommodated in the case and so arranged as to oppose the positive electrode with a separator sandwiched between them, and an alkali electrolyte contained in the case. The nickel hydroxide grains contained in the positive electrode have a structure in which cobalt and at least one transition metal selected from the group consisting of copper, bismuth, chromium, gallium, indium, lanthanum, scandium, and yttrium are coprecipitated with metal nickel at a ratio of 1.5 to 11.0 wt % with respect to nickel hydroxide.

19 Claims, 4 Drawing Sheets

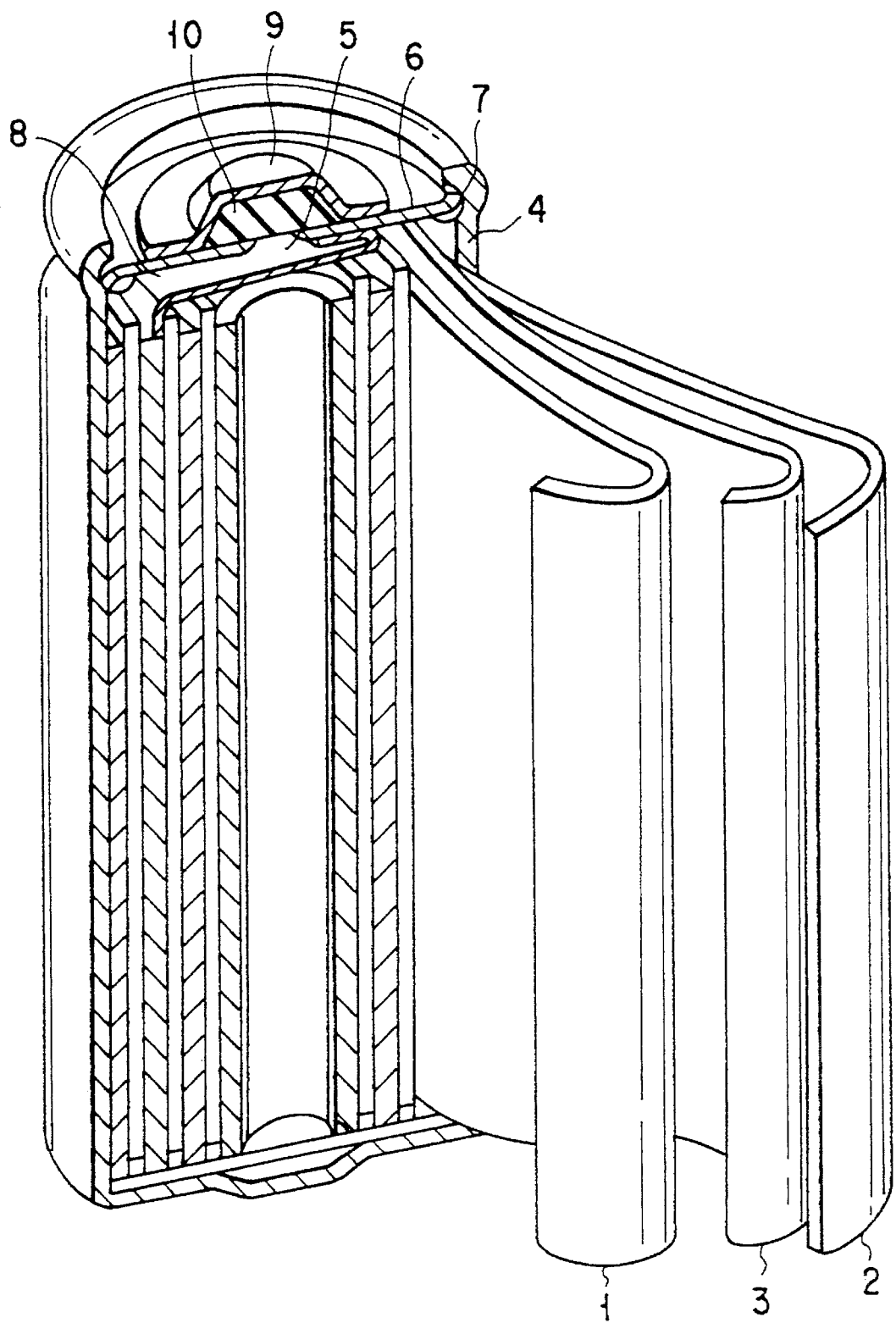
F I G. 1

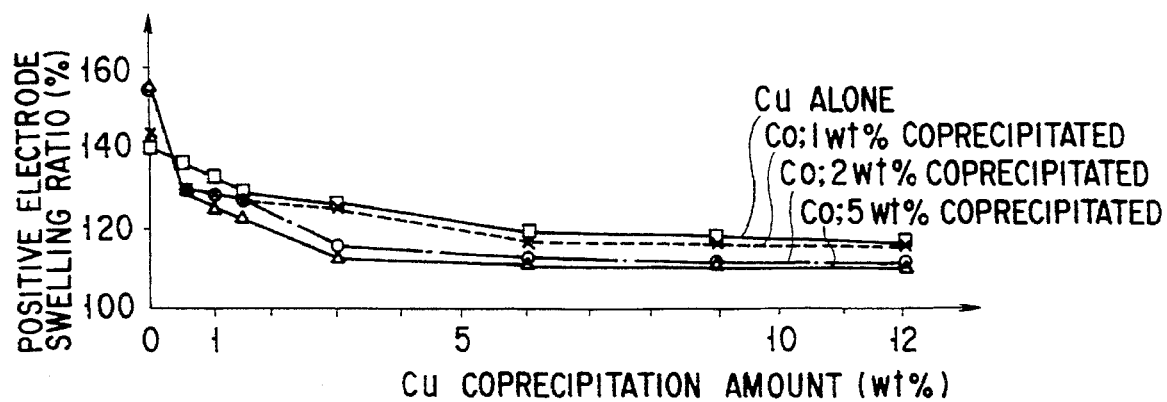
F I G. 5
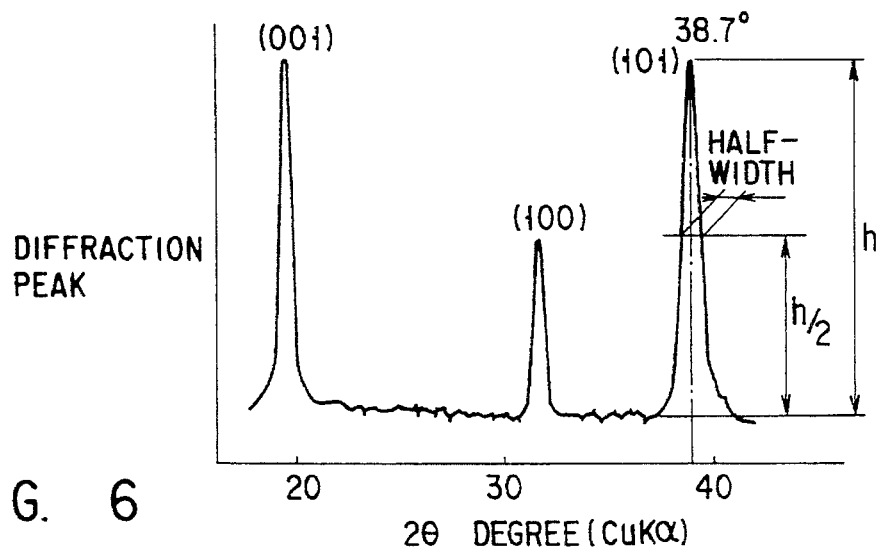
F I G. 6
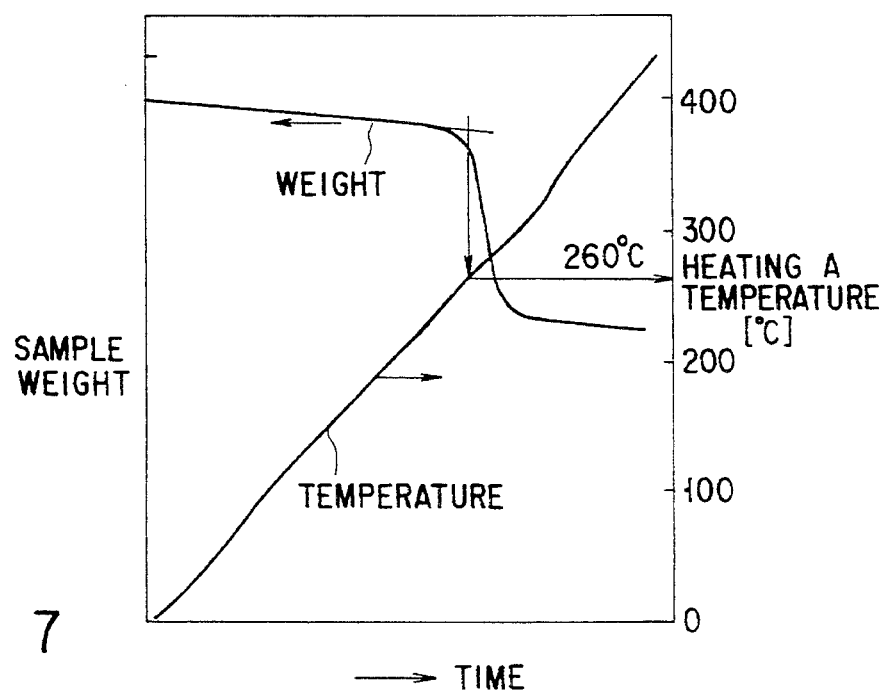
F I G. 7

ALKALI SECONDARY BATTERY

BACKGROUND OF THE INVENTION

1. Field of the Invention

The present invention relates to an alkali secondary battery and, more particularly, to an alkali secondary battery whose positive electrode containing nickel hydroxide as an active material is improved.

2. Description of the Related Art

A sintered positive electrode has been conventionally used as a positive electrode to be incorporated into an alkali secondary battery. This sintered positive electrode is manufactured by sintering nickel grains on a two-dimensional substrate, such as punched metal or a nickel mesh, impregnating holes ten-odd μm in diameter of the resultant porous plate with an aqueous nickel salt solution, and converting the impregnated nickel salt into nickel hydroxide by an alkali treatment.

The manufacture of the above sintered positive electrode, however, requires complicated active material impregnating operations such as the nickel salt impregnating step and the alkali treatment step. Additionally, these operations must be repeated four to ten times in order to impregnate a predetermined amount of an active material. This results in an increased manufacturing cost. Furthermore, if the porosity of the nickel grain sintered body obtained by the sintering as discussed above exceeds 80%, it is difficult to maintain the mechanical strength of the sintered body. Therefore, increasing the filling amount of the active material has its limit.

For these reasons, it has been attempted to manufacture a positive electrode by preparing a paste by adding a conductor, a binder, and water to nickel hydroxide grains and mixing the resultant material, and filling this paste into a metal porous body having a three-dimensional structure, such as a sponge-like metal porous body or a metal fiber mat with a mean porosity of 95% or more and a mean pore size of a few ten to a few hundred micrometers. The positive electrode manufactured by this method is called a nonsintered positive electrode (or a paste positive electrode) in comparison with the sintered positive electrode. The metal porous body of this paste positive electrode has a porosity and a mean pore size larger than those of the sintered positive electrode. This advantageously facilitates filling of the active material and can increase the filling amount of the material.

In the paste positive electrode, however, pores of the metal porous body, such as a sponge-like metal porous body, into which the paste is filled, are larger than those of sintered nickel. This increases the distance between the active material and a collector, resulting in a low conductivity. In addition, since concentration of the current density is caused as the absolute amount of the active material increases, the positive electrode swells especially in overcharge. Consequently, the utilization ratio of the positive electrode decreases, and this decreases, e.g., the charge/discharge efficiency.

For the above reasons, in order to take advantage of a large capacity of the paste positive electrode, it is necessary to (a) increase the conductivity, (b) suppress the swelling ratio of the positive electrode, and (c) increase the charge/discharge efficiency.

Increasing the conductivity is very important in decreasing the mean charge/discharge polarization potential of the positive electrode during charge/discharge of an alkali secondary battery.

The conductivity is improved by addition of metal cobalt or a cobalt compound, such as cobalt oxide or cobalt hydroxide.

Of the other two problems, (b) suppressing the swelling ratio of the electrode is a problem especially in overcharge, and (c) increasing the charge-discharge efficiency is a problem particularly at high temperatures. In solving the problem (b), it is important to minimize production of low-density γ-nickel oxyhydroxide (γ-NiOOH) as one higher order oxide during overcharge. In solving the problem (c), it is important to increase the oxygen overvoltage of the positive electrode at high temperatures, so that charge electrical energy is not partially consumed in generating oxygen gas.

To solve the above problems (b) and (c), addition of a transition metal or a transition metal compound is adopted in the formation of the sintered positive electrode. Well-known examples of the transition metal element to be added are cadmium (Cd) and cobalt (Co). Known examples of the method of adding this transition metal element are a method (coprecipitation addition method) of solidly dissolving the transition metal element, together with nickel atoms, into nickel hydroxide grains, and a method (mixing addition method) by which transition metal grains or grains of a transition metal compound (primarily oxide or hydroxide) are mixed together with nickel hydroxide grains during kneading in the paste preparation step. From an environmental point of view, however, a general consciousness for banning hazardous components of batteries has become acute recently. For example, the regulations for even a very slight amount of cadmium contained in the positive electrode of a nickel-hydrogen secondary battery have become stricter. A demand therefore has arisen for cadmium-free batteries.

As methods meeting this requirement, Jpn. Pat. Appln. KOKAI Publication No. 2-30061 has disclosed a method of coprecipitating and adding zinc or a zinc compound in place of cadmium, and Jpn. Pat. Appln. KOKAI Publication No. 3-77273 has disclosed a mixing addition method of this type. A positive electrode containing nickel hydroxide grains manufactured by the former zinc coprecipitation addition method is effective in decreasing the swelling ratio. However, a positive electrode containing nickel hydroxide grains manufactured by the latter zinc mixing addition method has no distinct effect of decreasing the swelling ratio. Additionally, when used at high temperatures, the low-rate charge efficiency of the positive electrode containing nickel hydroxide grains manufactured by the zinc coprecipitation addition method or the zinc mixing addition method is lower by about 15 to 20% than that of the positive electrode containing nickel hydroxide grains added with an equal quantity of cadmium. Consequently, although a cadmium-free positive electrode can be obtained, (c) increasing the charge/discharge efficiency noted previously has not been basically achieved yet when the positive electrode is incorporated into a battery.

Jpn. Pat. Appln. KOKAI Publication No. 5-21064, on the other hand, has disclosed an alkali storage battery which includes a positive electrode containing nickel hydroxide grains consisting of a mixture of spherical or almost spherical grains and aspherical grains containing at least one of Cd, Ca, Zn, Mg, Fe, Co, and Mn, and in which the capacity density and the cycle life of the positive electrode are improved by discouraging swelling of the positive electrode.

SUMMARY OF THE INVENTION

It is an object of the present invention to provide an alkali secondary battery which includes a cadmium-free positive electrode whose swelling ratio is suppressed, and in which the cycle characteristic is improved and the charge efficiency in use at high temperatures is also improved.

According to the present invention, there is provided an alkali secondary battery comprising:

a positive electrode accommodated in a case and having a structure in which a paste containing nickel hydroxide grains, a conductor, and a binder is filled in a metal porous body;

a negative electrode accommodated in the case and so arranged as to oppose the positive electrode with a separator sandwiched between them; and an alkali electrolyte contained in the case, wherein the nickel hydroxide grains contained in the positive electrode have a structure in which cobalt and at least one transition metal selected from the group consisting of copper, bismuth, chromium, gallium, indium, lanthanum, scandium, and yttrium are coprecipitated with metal nickel at a ratio of 1.5 to 11.0 wt % with respect to nickel hydroxide.

In addition, according to the present invention, there is provided an alkali secondary battery comprising:

a positive electrode accommodated in a case and having a structure in which a paste containing nickel hydroxide grains, a conductor, and a binder is filled in a metal porous body;

a negative electrode accommodated in the case and so arranged as to oppose the positive electrode with a separator sandwiched between them; and an alkali electrolyte contained in the case, wherein the nickel hydroxide grains contained in the positive electrode have a structure in which at least one transition metal selected from the group consisting of copper, bismuth, and indium is coprecipitated with metal nickel at a ratio of 1.5 to 11.0 wt % with respect to nickel hydroxide.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a partially exploded perspective view showing a nickel-hydrogen secondary battery according to the present invention;

FIG. 5 is a graph showing the swelling ratio of each of positive electrodes containing nickel hydroxide grains of Example 2 of the present invention as active materials;

FIG. 6 is a graph showing an example of an X-ray powder diffraction chart;

FIG. 7 is a graph showing an example of a thermogravimetry chart;

DETAILED DESCRIPTION OF THE PREFERRED EMBODIMENTS

Figure 2:
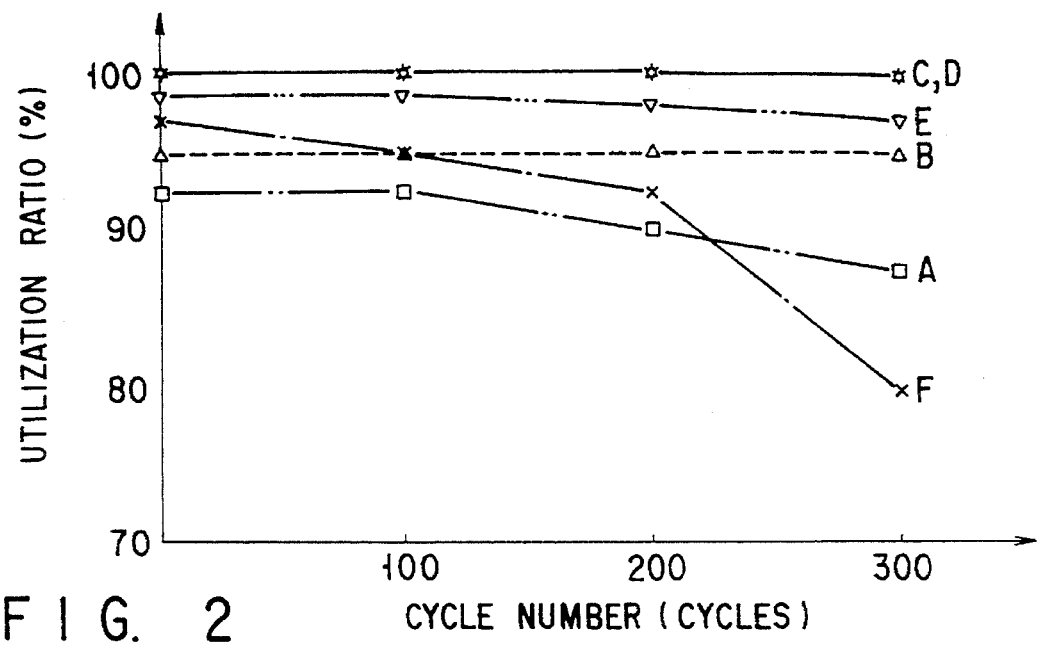
FIG. 2 is graph showing the relationship between the cycle number and the utilization ratio of each of nickel-hydrogen secondary batteries of Example 1 of the present invention.

An alkali secondary battery according to the present invention will be described in detail below with reference to FIG. 1.

Referring to FIG. 1, a negative electrode 2 is spirally wound to oppose a positive electrode 1 with a separator 3 interposed between them, and accommodated in a closed-end cylindrical case 4. An alkali electrolyte is also contained in the case 4. A circular sealing plate 6 having a hole 5 at its center is arranged on the upper opening of the case 4. A ring-like insulating gasket 7 is arranged between the peripheral edge of the sealing plate 6 and the inner surface of the upper opening of the case 4. The sealing plate 6 is airtightly fixed to the case 4 via the gasket 7 by caulking the upper opening such that the diameter of the opening is reduced inward. One end of a positive lead 8 is connected to the positive electrode 1, and its other end is connected to the lower surface of the sealing plate 6. A hat-like positive terminal 9 is attached on top of the sealing plate 4 so as to cover the hole 5. A rubber safety valve 10 is so arranged as to close the hole 5 in a space surrounded by the sealing plate 4 and the positive terminal 9.

Details of the negative electrode 2, the positive electrode 1, the separator 3, and the alkali electrolyte will be described below.

1) Negative electrode 2

The negative electrode 2 is, e.g., a hydrogen-absorbing alloy negative electrode containing hydrogen-absorbing alloy grains which absorb and release hydrogen. A negative electrode of this sort has a structure in which a depolarizing mix for cell containing the hydrogen-absorbing grains, a conductor, and a binder is fixed to a conductive core member as a collector.

Examples of the hydrogen-absorbing alloy to be blended in the depolarizing mix for cell of the negative electrode 2 are $LaNi_5$; $MmNi_5$ (Mm is a misch metal); $LmNi_5$ (Lm is at least one element selected from rare earth elements including La); a multi-element alloy in which a portion of Ni of any of the above alloys is substituted with an element, such as Al, Mn, Co, Ti, Cu, Zn, Zr, Cr, or B; a TiNi-based alloy; and a TiFe-based alloy. In particular, a hydrogen-absorbing alloy with a composition represented by formula $LmNi_w\text{-}Co_xMn_yAl_z$ (wherein the total of atomic ratios w, x, y, and z is $5.00 \leq w+x+y+z \leq 5.50$) is preferred since the charge/ discharge cycle life can be improved by discouraging grain size reduction which occurs as the charge/discharge cycle proceeds. Of hydrogen-absorbing alloys represented by the formula $LmNi_wCo_xMn_yAl_z$, three hydrogen-absorbing alloys having the following compositions are more preferred.

A hydrogen-absorbing alloy represented by formula $LmNi_wCo_xMn_yAl_z$ (wherein Lm is at least one element selected from rare earth elements including La, the values of atomic ratios w, x, y, and z are $4.09 \leq w \leq 4.50$, $0.38 \leq x < 0.41$, $0.28 \leq y < 0.31$, and $0.28 \leq z < 0.31$, and the total of the atomic ratios w, x, y, and z is $5.10 \leq w+x+y+z \leq 5.50$).

A hydrogen-absorbing alloy represented by formula $LmNi_wCo_xMn_yAl_z$ (wherein Lm is at least one element selected from rare earth elements including La, the values of atomic ratios w, x, y, and z are $4.09 \leq w \leq 4.50$, $0.41 \leq x \leq 0.50$, $0.28 \leq y < 0.31$, and $0.28 \leq z < 0.31$, and the total of the atomic ratios w, x, y, and z is $5.10 \leq w+x+y+z \leq 5.50$).

A hydrogen-absorbing alloy represented by formula $LmNi_wCo_xMn_yAl_z$ (wherein Lm is at least one element selected from rare earth elements including La, the values of atomic ratios w, x, y, and z are $4.09 \leq w \leq 4.50$, $0.38 \leq x < 0.41$, $0.28 \leq y < 0.31$, and $0.31 \leq z \leq 0.50$, and the total of the atomic ratios w, x, y, and z is $5.10 \leq w+x+y+z \leq 5.50$).

Examples of the conductor are carbon black and graphite. It is preferred to blend this conductor in an amount ranging between 0.1 and 4 parts by weight with respect to 100 parts by weight of the hydrogen-absorbing alloy powder.

Examples of the binder are a polyacrylate such as soda polyacrylate and potassium polyacrylate, a fluorine-based resin such as polytetrafluoroethylene (PTFE), and carboxymethylcellulose (CMC). It is preferred to blend this binder in an amount of 0.1 to 5 parts by weight with respect to 100 parts by weight of the hydrogen-absorbing alloy.

Examples of the conductive core member are a two-dimensional structure such as a punched metal, an expanded metal, and a metal mesh, and a three-dimensional structure such as a foamed metal and a network sintered metal fiber.

2) Positive electrode 1

The positive electrode 1 has a structure in which a paste containing nickel hydroxide grains, a conductor, and a binder is filled in a metal porous body. The positive electrode 1 with this structure is manufactured by preparing a paste by kneading the nickel hydroxide grains and the conductor, together with the binder, in the presence of water, filling and drying this paste in the metal porous body, and, if necessary, roller-pressing the resultant material.

One form of the nickel hydroxide grains has a structure in which cobalt (Co) and at least one transition metal selected from the group consisting of copper (Cu), bismuth (Bi), chromium (Cr), gallium (Ga), indium (In), lanthanum (La), scandium (Sc), and yttrium (Y) are coprecipitated with metal nickel at a ratio of 1.5 to 11.0 wt % with respect to nickel hydroxide.

The coprecipitation mentioned above means that predetermined amounts of cobalt and the transition metal are dissolved in metal nickel, i.e., Ni of nickel hydroxide (OH-Ni-OH) to form a nickel-cobalt-transition metal solid solution. Cobalt, copper, bismuth, chromium, gallium, indium, lanthanum, scandium, and yttrium to be coprecipitated with nickel meet conditions (1) to (6) below.

(1) These elements must be dissolvable as ions in an acid such as an aqueous sulfuric acid solution or an aqueous nitric acid solution. Generally, however, when an aqueous nitric acid solution is used, a nitric acid radical ($NO_3^-$) tends to remain in produced nickel hydroxide because of the characteristics of a battery, and this degrades the self-discharge characteristic. Therefore, the use of an aqueous sulfuric acid is preferred.

(2) A salt which does not dissolve in water must be produced when the aqueous solution prepared in item (1) above is neutralized with a base such as sodium hydroxide.

(3) The point of the neutralization in item (2) above must be almost equal to a point at which a complex ion of nickel becomes nickel hydroxide.

(4) The valence of the transition metal element to be coprecipitated must be nearly the same as that of nickel.

(5) A change in the valence must be small during the reaction.

(6) The ion radius of the transition metal element to be coprecipitated must be nearly the same as that of nickel. If the ion radii of the two are extremely different, no substituted solid solution is formed. By intentionally using a transition metal element whose ion radius is slightly larger than that of nickel, it is possible to form strains in nickel hydroxide grains produced.

It is particularly preferable that the substance to be coprecipitated with metal nickel consist of cobalt and one transition metal selected from the group consisting of copper, bismuth, and indium.

Cobalt and the transition metal are preferably coprecipitated with metal nickel of nickel hydroxide at ratios of 1.5 to 5 wt % and 1.5 to 6 wt %, respectively, with respect to nickel hydroxide. An alkali secondary battery including a positive electrode containing nickel hydroxide grains in which these amounts of cobalt and a transition metal are coprecipitated with metal nickel is further improved in charge efficiency and has a large capacity.

The ratio of the substance to be coprecipitated with metal nickel in the nickel hydroxide grains is limited for the reasons explained below. That is, if the coprecipitation ratio of the substance is less than 1.5 wt %, the effect of suppressing the swelling ratio of the positive electrode containing the nickel hydroxide grains is unsatisfactory, and the charge/discharge efficiency cannot be increased sufficiently. If the coprecipitation ratio of the substance exceeds 11.0 wt %, nickel hydroxide as an active material of the positive electrode reduces in amount to lead to a decrease in the capacity. A more preferable coprecipitation ratio of the substance is 3 to 8 wt % with respect to nickel hydroxide.

The nickel hydroxide grains preferably have a spherical shape or a shape close to a sphere.

The nickel hydroxide grains are prepared by, e.g., the following method.

That is, metal nickel, cobalt, and at least one transition metal selected from the group consisting of copper, bismuth, chromium, gallium, indium, lanthanum, scandium, and yttrium are dissolved in an aqueous sulfuric acid solution, thereby producing a nickel complex ion, cobalt complex ion, and transition metal complex ion. Thereafter, the resultant solution is dropped into an aqueous sodium hydroxide solution to grow nickel hydroxide grains in which cobalt and the transition metal are precipitated with metal nickel. That is, the nickel hydroxide grains have a nickel-cobalt-transition metal solid solution in which the cobalt and the transition metal are dissolved in the metal nickel. In this neutralization process, it is possible to gradually perform nucleation and growth of crystals of nickel hydroxide by dropping the solution containing the above complex ions into the aqueous sodium hydroxide solution while convecting the complex ion solution. This makes it possible to obtain nickel hydroxide grains having a spherical or almost spherical shape and a high density, i.e., not having many pores. In addition, the nickel hydroxide crystals in which cobalt and the transition metal are coprecipitated can be increased in size by controlling the temperature and the pH when the complex ions of nickel, cobalt, and the transition metal in the aqueous sulfuric acid solution are neutralized with the aqueous sodium hydroxide solution. More specifically, large nickel hydroxide crystals can be produced by controlling the temperature to be close to the transition temperature (in this case, 40° C.) and controlling the pH in a weak base region to set a metastable region (e.g., pH 11) as close as possible to neutralization. Note that in order to produce small nickel hydroxide crystals, the reaction need only be stopped before large crystals start to grow.

Another form of the nickel hydroxide grains has a structure in which at least one transition metal selected from the group consisting of copper, bismuth, and indium is coprecipitated with metal nickel at a ratio of 1.5 to 11.0 wt % with respect to nickel hydroxide.

The coprecipitation mentioned above means that predetermined amounts of transition metal is dissolved in the metal nickel, i.e., Ni of nickel hydroxide (OH-Ni-OH) to form a nickel-transition metal solid solution.

The ratio of the transition metal to be coprecipitated with metal nickel contained in the nickel hydroxide grains is limited for the reasons explained below. That is, if the coprecipitation ratio of the transition metal is less than 1.5 wt %, the effect of suppressing the swelling ratio of the positive electrode containing the nickel hydroxide grains is unsatisfactory, and the charge/discharge efficiency cannot be increased sufficiently. If the coprecipitation ratio of the transition metal exceeds 11.0 wt %, nickel hydroxide as an active material of the positive electrode reduces in amount to lead to a decrease in the capacity. A more preferable coprecipitation ratio of the transition metal is 3 to 6 wt % with respect to nickel hydroxide.

The nickel hydroxide grains preferably have a spherical shape or a shape close to a sphere.

The nickel hydroxide grains are prepared by, e.g., the following method.

That is, metal nickel and at least one transition metal selected from the group consisting of copper, bismuth, and indium are dissolved in an aqueous sulfuric acid solution, thereby producing a nickel complex ion and transition metal complex ion. Thereafter, the resultant solution is dropped into an aqueous sodium hydroxide solution to grow nickel hydroxide grains in which the transition metal is precipitated with metal nickel. That is, the nickel hydroxide grains have a nickel-transition metal solid solution in which the transition metal is dissolved in the metal nickel. In this neutralization process, it is possible to gradually perform nucleation and growth of crystals of nickel hydroxide by dropping the solution containing the above complex ions into the aqueous sodium hydroxide solution while convecting the complex ion solution. This makes it possible to obtain nickel hydroxide grains having a spherical or almost spherical shape and a high density, i.e., not having many pores. In addition, the nickel hydroxide crystals in which the transition metal is coprecipitated can be increased in size by controlling the temperature and the pH when the complex ions of nickel and the transition metal in the aqueous sulfuric acid solution are neutralized with the aqueous sodium hydroxide solution. More specifically, large nickel hydroxide crystals can be produced by controlling the temperature to be close to the transition temperature (in this case, 40° C.) and controlling the pH in a weak base region to set a metastable region (e.g., pH 11) as close as possible to neutralization. Note that in order to produce small nickel hydroxide crystals, the reaction need only be stopped before large crystals start to grow.

The nickel hydroxide grains in each of the above forms preferably have a mean grain size of 5 to 30 μm and a tap density of 1.8 g/cm$^3$ or more.

The nickel hydroxide grains in each of the above forms preferably have a specific surface area of 8 to 25 m$^2$/g.

The nickel hydroxide grains in each of the above forms preferably have a half-width of a peak in a (101) plane of 0.8° or more in powder X-ray diffraction (2θ).

The nickel hydroxide grains in each of the above forms preferably have a thermal decomposition temperature of 270° C. or less in thermogravimetry. The thermal decomposition means that nickel hydroxide (Ni(OH)$_2$) is decomposed into NiO and H$_2$O.

Examples of the conductor to be blended in the paste of the positive electrode 1 are metal cobalt and a cobalt compound such as cobalt hydroxide and cobalt monoxide. Note that this metal cobalt or cobalt compound does not coprecipitate with metal nickel in nickel hydroxide but is simply mixed. The mixing amount of the conductor desirably ranges from 5 to 10 wt % with respect to the nickel hydroxide grains.

Examples of the binder to be blended in the paste of the positive electrode 1 are carboxymethylcellulose, a polyacrylate, and a fluorine-based resin (e.g., polytetrafluoroethylene). The mixing amount of the binder desirably ranges between 1 and 5 wt % with respect to the nickel hydroxide grains.

Examples of the metal porous body are a sponge-like metal porous body and a metal fiber mat.

3) Separator 3

Examples of the separator 3 are polypropylene unwoven fabric, nylon unwoven fabric, and unwoven fabric consisting of polypropylene fibers and nylon fibers. In particular, polypropylene unwoven fabric whose surface is treated to become hydrophilic is suitable as the separator 3. The thickness of the separator 3 is preferably 100 to 200 μm.

4) Alkali electrolyte

Examples of the alkali electrolyte are a solution mixture of sodium hydroxide (NaOH) and lithium hydroxide (LiOH), a solution mixture of potassium hydroxide (KOH) and LiOH, and a solution mixture of NaOH, KOH, and LiOH.

In FIG. 1 mentioned earlier, the separator 3 is interposed between the negative electrode 2 and the positive electrode 1, and the resultant structure is spirally wound and accommodated in the closed-end cylindrical case 4. However, it is also possible to interpose separators between a plurality of negative electrodes and a plurality of positive electrodes, respectively, and accommodate the resultant layered structure in a closed-end cylindrical case.

The alkali secondary battery according to the present invention includes a positive electrode with an arrangement in which a metal porous body is filled with a paste containing nickel hydroxide grains, a conductor, and a binder. In the nickel hydroxide grains, cobalt and at least one metal selected from the group consisting of copper, bismuth, chromium, gallium, indium, lanthanum, scandium, and yttrium are coprecipitated with metal nickel at a ratio of 1.5 to 11.0 wt % with respect to nickel hydroxide, or, at least one metal selected from the group consisting of copper, bismuth, and indium is coprecipitated with metal nickel at a ratio of 1.5 to 11.0 wt % with respect to nickel hydroxide. That is, the alkali secondary battery of the present invention includes a cadmium-free positive electrode. Since the swelling ratio of the positive electrode is suppressed in this alkali secondary battery, the battery is improved in cycle characteristic and in charge efficiency at high temperatures.

This effect of suppressing the swelling ratio of the positive electrode with the above arrangement will be described below.

The mechanism of swelling of the positive electrode is assumed as follows. That is, a nickel hydroxide grain has a layered crystal structure like that of cadmium iodide. Protons and cations enter or exit through these layers to cause strain each time charge or discharge is performed, and this widens the spacings between the layers. This crystal structure becomes γ-nickel oxyhydroxide (γ-NiOOH) especially in overcharge.

The nickel hydroxide grains in which predetermined amounts of cobalt and a specific transition metal are coprecipitated with metal nickel, or a predetermined amount of a specific transition metal is coprecipitated with metal nickel can enhance the bonding force between the layers while maintaining smooth entrance and exit of protons. It is estimated that this consequently suppresses the swelling ratio of the positive electrode without decreasing its utilization ratio. No technique capable of directly measuring this interlayer bonding force (bonding energy) itself has been established yet, but it is possible to qualitatively determine the force by thermal analysis.

A positive electrode containing nickel hydroxide grains, in which either cobalt and a specific transition metal or only a specific transition metal is coprecipitated with metal nickel, and having a thermal decomposition temperature of 270° C. or lower in thermogravimetry, among other thermal analysis processes, has a better swelling ratio suppression effect.

The effect of increasing the charge efficiency of the positive electrode with the above arrangement at high temperatures will be described below.

Nickel hydroxide grains in which various types of transition metals are coprecipitated with metal nickel prove to raise the oxygen overvoltage upon charge in many cases. The oxygen overvoltage normally means a potential difference at which two reactions represented by reaction formulas (1) and (2) below take place:

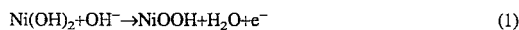

$$Ni(OH)_2 + OH^- \rightarrow NiOOH + H_2O + e^- \quad (1)$$

$$OH^- \rightarrow \tfrac{1}{2}H_2O + \tfrac{1}{4}O_2 + e^- \quad (2)$$

To increase the charge efficiency when charge is performed with the rate and the depth maintained constant, it is only necessary to consume the charge electrical energy as a large amount as possible in the reaction represented by Formula (1) above, i.e., in the reaction of producing nickel oxyhydroxide, by minimizing the reaction potential in Formula (1) and maximizing the reaction potential in Formula (2). In other words, the oxygen overvoltage need only be raised.

The nickel hydroxide grains in which predetermined amounts of cobalt and a specific transition metal are coprecipitated with metal nickel, or in which a predetermined amount of a specific transition metal is coprecipitated with metal nickel, to be used as an active material of the positive electrode of the present invention, have a high oxygen overvoltage nearly equal to that of nickel hydroxide grains in which cobalt and cadmium are coprecipitated. Therefore, an alkali secondary battery improved in charge efficiency can be realized.

In addition, the nickel hydroxide grains in which either predetermined amounts of cobalt and a specific transition metal or a predetermined amount of only a specific transition metal is coprecipitated with metal nickel, and which have a crystal strain and a predetermined grain size, tap density, or specific surface area can decrease the reaction potential of Formula (1) (or that of the reaction in the reverse direction) explained above in the item concerning the increase in charge efficiency, thereby allowing easy occurrence of the reaction. Consequently, an alkali secondary battery including the positive electrode containing the nickel hydroxide grains has a high utilization ratio (charge/discharge efficiency).

More specifically, it is generally considered that a charge/discharge process taking place in a positive electrode can be divided into two processes: a process in which protons (H⁺) diffuse between internal layers of nickel hydroxide grains; and a process in which these protons are electrically neutralized with electrons (e⁻) entering from an external circuit via a metal porous body and a conductor.

To smoothly diffuse the internal protons of the nickel hydroxide grains in the former process, it is necessary to increase the crystal strain of the grains to a certain extent. As a measure for determining a crystal strain, a half-width of a peak in a (101) plane in powder X-ray diffraction (2θ) can be used. It is of course possible to use a half-width in a (001) plane or a (100) plane, as well as the (101) plane, as a measure of the crystal strain. The larger the peak half-width, the more largely the crystal is strained. Therefore, the use of nickel hydroxide grains having a peak half-width of 0.8° or more makes it possible to smoothly diffuse the internal protons, and this further increases the charge/discharge efficiency.

As has been already discussed above, the conductivity of the positive electrode contributes to the latter process of neutralizing protons (H⁺) and electrons (e⁻). This contribution is divided into physical factors, such as the mixing dispersibility of nickel hydroxide grains and conductor grains in the preparation of a paste and the distance to a collector bulk of a metal porous body filled with these grains, and chemical factors, such as the reaction area of the surface of a nickel hydroxide grain. When particular materials are selected as the metal porous body and the conductor, the physical factors relate to the grain size and the tap density of nickel hydroxide grains, and the chemical factors relate to the specific surface area of nickel hydroxide grains. Therefore, the utilization ratio can be increased by improving the conductivity and the reactivity by using nickel hydroxide grains with a mean grain size of 5 to 30 μm, a tap density of 1.8 g/cm³ or more, and a specific surface area of 8 to 25 m²/g.

Furthermore, the paste can be evenly filled in the metal porous body by the use of nickel hydroxide grains having a spherical shape or a shape close to a sphere. This makes it possible to eliminate variations in capacity between batteries and concentration of currents during charge/discharge.

That is, as mentioned earlier, nickel hydroxide grains with a spherical shape or an almost spherical shape can be obtained by causing convection in the process of neutralizing a sulfuric acid complex ion of nickel with sodium hydroxide. A paste containing nickel hydroxide grains having this shape can be filled evenly in the metal porous body, and this can eliminate variations in capacity between batteries. Additionally, since nickel hydroxide grains contained in the paste filled in the metal porous body are spherical, a difference in current density can be prevented from being produced during charge/discharge. Consequently, concentration of currents can be avoided, and this improves the cycle life.

The present invention will be described in greater detail below by way of its preferred examples.

EXAMPLE 1

To begin with, metal nickel (Ni), metal copper (Cu), and metal cobalt (Co) were dissolved in an aqueous sulfuric acid solution to prepare six types of solutions in which a nickel complex ion, copper complex ion, and cobalt complex ion were produced. Subsequently, these solutions were dropped into an aqueous sodium hydroxide solution to obtain six types of nickel hydroxide grains in which cobalt and copper were coprecipitated with metal nickel. In this neutralization process, nickel hydroxide crystals were gradually grown by causing convection in the aqueous sodium hydroxide solution, and the temperature and the pH were controlled.

The resultant six types of nickel hydroxide grains were spherical and highly dense with few pores. The mean grain size, the tap density, and the specific surface area of each of the six types of nickel hydroxide grains were as given in Table 1 to be presented later.

The mean grain size was obtained from 50% of the accumulated grain size distribution of the nickel hydroxide grains measured by a laser method. The tap density was measured by filling the nickel hydroxide grains into a vessel (volume 20 cm$^3$), i.e., SEISHIN TAPDENSER KYT 3000 (tradename) available from SEISHIN CO. LTD., and performing tapping 200 times. The specific surface area was measured by a nitrogen BET adsorption method.

The resultant nickel hydroxide grains of each type were also analyzed by a powder X-ray diffraction method. No peaks of copper and cobalt appeared in the grains of each type. In addition, the nickel hydroxide grains of each type were dissolved in hydrochloric acid, the solution was analyzed by an atomic absorption method to determine amounts of cobalt and copper. Cobalt and copper were present at ratios of 1 wt % and 5 wt %, respectively, with respect to nickel hydroxide. These analyses showed that in the nickel hydroxide grains Co and Cu were substituted and dissolved in Ni of part of nickel hydroxide (OH-Ni-OH), at ratios of 1 wt % and 5 wt %, respectively, with respect to the nickel hydroxide. Thereby, the nickel hydroxide grains had a nickel-cobalt-copper solid solution in which cobalt and copper dissolved in metal nickel at ratios of 1 wt % and 5 wt %, respectively, with respect to the nickel hydroxide. Also, a half-width of a diffraction peak in a (101) plane in powder X-ray diffraction (2θ) was measured for each type of the nickel hydroxide grains. Consequently, the half-widths of all of the six types of nickel hydroxide grains were 0.95°. Furthermore, when the shapes of the nickel hydroxide grains were observed by using an electron microscope, all these grains were found to be spherical.

TABLE 1

| Type of nickel hydroxide grains | Mean grain size (μm) | Tap density (g/cm$^3$) | Specific surface area (m$^2$/g) |
|---|---|---|---|
| A | 1.4 | 1.6 | 28.0 |
| B | 5.2 | 1.9 | 23.3 |
| C | 10.1 | 2.2 | 18.0 |
| D | 20.3 | 1.9 | 16.0 |
| E | 30.0 | 1.8 | 8.0 |
| F | 50.2 | 1.2 | 7.5 |

Subsequently, 10 parts by weight of cobalt monoxide were added to 100 parts by weight of each of the six types of cobalt-copper coprecipitated nickel hydroxide grains, and the resultant grains were kneaded with carboxymethylcellulose (a binder) and pure water, thereby preparing six types of pastes. These pastes were then filled and dried in nickel-plated metal porous bodies with a porosity of 96% and a mean pore size of 200 μm, manufacturing six types of nickel positive electrodes.

Separately, commercially available Mm (a misch metal; a mixture of rare earth elements), Ni, Co, Mn, and Al were weighed at a weight ratio of 4.0:0.4:0.3:0.3 and dissolved in a high-frequency furnace. The molten metal was cooled to form an alloy ingot having a composition of $MmNi_{4.0}Co_{0.4}Mn_{0.3}Al_{0.3}$. Subsequently, the alloy ingot was mechanically powdered and screened to form a hydrogen-absorbing alloy powder with a particle size of 50 μm. This hydrogen-absorbing alloy powder was added with carboxymethylcellulose, carbon, and water to prepare a paste. Thereafter, the paste was coated on a punched metal, dried, and molded to manufacture a negative electrode.

A separator consisting of polypropylene unwoven fabric treated to become hydrophilic was arranged between the positive and negative electrodes manufactured as described above, and this electrode structure was accommodated in a metal case. Thereafter, an electrolyte consisting primarily of potassium hydroxide was also contained in the case. In this fashion, six types of nickel-hydrogen secondary batteries (12 batteries total) having the structure discussed earlier with reference to FIG. 1 were assembled by further using members such as metal covers. In this assembling step, two secondary batteries were assembled for each of the six types of positive electrode arrangements, i.e., a total of 12 batteries were assembled. After being assembled, each battery was aged at 25° C. for 15 hours, charged with an electricity quantity of 0.1 CmA for 15 hours, and discharged with a cut of 1.0 CmA/1.0 V after a pause of 30 minutes. In this manner, initial charge/discharge was performed for the batteries.

The resultant nickel-hydrogen secondary batteries were divided into two groups each consisting of six batteries different in positive electrode arrangement. The secondary batteries of one group were subjected to charge/discharge, in which each battery was charged to a depth of 150% with an electricity quantity of 0.3 CmA and discharged with a cut of 1.0 CmA/1.0 V, repeatedly 300 times, and the utilization ratio of the positive electrode in each battery was measured. Consequently, a graph shown in FIG. 2 was obtained.

The secondary batteries of the other group were subjected to charge/discharge, in which each battery was charged to a depth of 150% with a current of 0.3 CmA and discharged with a cut of 1.0 CmA/1.0 V, repeatedly 20 times. The batteries were then charged with a current of 0.1 CmA at 0° C. for 30 days and discharged with a cut of 1.0 CmA/1.0 V at 25° C. Thereafter, each resultant secondary battery was disassembled, and the thickness of the positive electrode was measured by a micrometer, thereby measuring the swelling ratio of the positive electrode after the overcharge at 0° C. and 0.1 VmA from the ratio of the measured thickness to the thickness of the positive electrode before the electrode was incorporated into the case. Consequently, a graph shown in FIG. 3 was obtained.

As is apparent from FIG. 2, each of the positive electrodes containing cobalt-copper coprecipitated nickel hydroxide grains B, C, D, and E each having the mean grain size, the tap density, and the specific surface area shown in Table 1 had an extremely high utilization ratio as compared with that of the positive electrode containing cobalt-copper coprecipitated nickel hydroxide grains F in Table 1. The reason for this is assumed that the cobalt-copper coprecipitated nickel hydroxide grains F had a large mean grain size of 50.2 μm and a low tap density of 1.2 g/cm$^3$. However, it is obvious by comparing the nickel hydroxide grains E and F having a relatively small difference in specific surface area as in Table 1 that the influence of the specific surface area is small.

In effect, by observing the state of the positive electrode at the time the paste containing the nickel hydroxide grains F of Table 1 was filled into the nickel-plated porous body, dried, and molded, it was confirmed that the gradation level difference in green (nickel hydroxide is normally green) resulting from uneven filling was significant compared to those obtained when the nickel hydroxide grains B, C, D, and E of Table 1 were used. A positive electrode filled unevenly with nickel hydroxide grains has an effect on the electrolyte distribution. This unnecessarily gives a difference in degree of formation of a conductive matrix using cobalt monoxide mentioned earlier in the battery activation processes, such as aging and initial charge/discharge.

FIG. 2 also reveals that the positive electrode containing the cobalt-copper coprecipitated nickel hydroxide grains A in Table 1 had a low utilization ratio, although this utilization ratio was not as low as that of the positive electrode using the nickel hydroxide grains F. The reason for this is estimated that the tap density of the nickel hydroxide grains A was decreased (1.6 g/cm$^3$) because the mean grain size of the grains was as small as 1.4 μm, and this resulted in an insufficient mixing dispersibility with respect to cobalt monoxide. Furthermore, it is apparent from FIG. 2 that the positive electrode containing the nickel hydroxide grains A was inferior to the other electrodes in utilization ratio from the initial periods of the cycle test. This is so because the nickel hydroxide grains A requires a larger amount of the binder to stabilize the viscosity in preparing the paste as the grain size decreases and the specific surface area increases (28.0 m$^2$/g).

Figure 3:
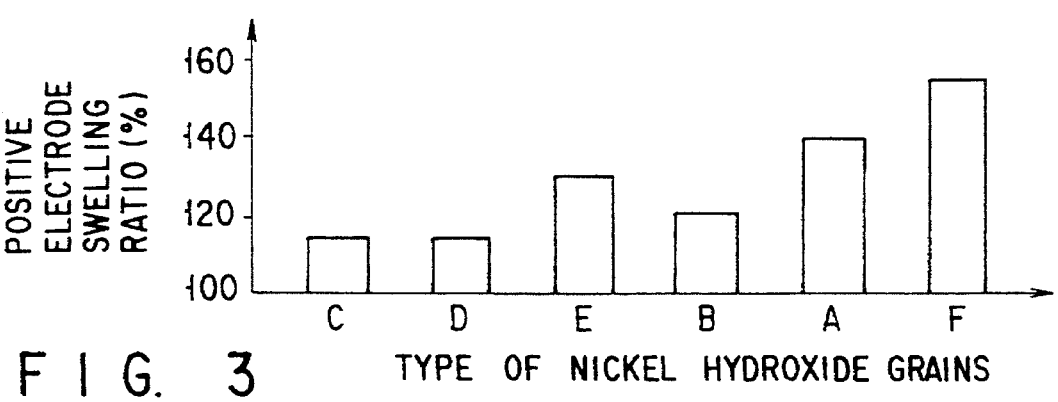
FIG. 3 is a graph showing the relationship between the type of metal-coprecipitated nickel hydroxide grains of Example 1 of the present invention and the swelling ratio of each of positive electrodes containing these nickel hydroxide grains as active materials.

FIG. 3 shows that each of the positive electrodes containing the cobalt-copper coprecipitated nickel hydroxide grains B, C, D, and E each having the mean grain size, the tap density, and the specific surface area shown in Table 1 had a low swelling ratio, as in the relationship with the utilization ratio in FIG. 2, for the reason explained below. More specifically, a positive electrode having a larger reduction in utilization ratio with respect to the cycle number shown in FIG. 2 has a larger swelling ratio. That is, as already described above, if the mean grain size of nickel hydroxide grains falls outside a proper range, the degree of formation of a conductive matrix using cobalt monoxide becomes insufficient. Therefore, currents are concentrated in a portion with a high conductivity, and consequently γ-NiOOH is produced in that portion. Since the portion is deficient in the electrolyte for discharging this γ-NiOOH, the production of γ-NiOOH is accelerated once γ-NiOOH is produced. The γ-NiOOH itself is assumed to encourage swelling of a positive electrode because the γ-NiOOH has not only a lower conductivity but a lower density and a larger volume than those of γ-Ni(OH)2 and γ-NiOOH.

For the above reasons, it is possible to realize a positive electrode with a high utilization ratio and a low swelling ratio by using any of the cobalt-copper coprecipitated nickel hydroxide grains B, C, D, and E, in Table 1, each having a mean grain size of 5 to 30 μm, a tap density of 1.8 g/cm$^3$ or more, and a specific surface area of 8 to 25 m$^2$/g.

EXAMPLE 2

Positive electrodes were manufactured following the same procedures as in Example 1 by using 32 types of nickel hydroxide grains prepared by combining cobalt coprecipitation amounts of 0, 1, 2, and 5 wt % and copper coprecipitation amounts of 0, 0.5, 1, 1.5, 3, 6, 9, and 12 wt %. All of these different types of nickel hydroxide grains were spherical and had a mean grain size of 10 μm, a tap density of 2.2 g/cm$^3$, and a specific surface area of 18.0 m$^2$/g, although they were different in cobalt and copper coprecipitation amounts.

Following the same procedures as in Example 1, each positive electrode was accommodated together with a negative electrode and a separator in a case, and an alkali electrolyte was contained in the case. In this manner, 32 types of nickel-hydrogen secondary batteries having the structure as shown in FIG. 1 were assembled by further using members such as metal covers. In this assembling step, two secondary batteries were assembled for each of the 32 types of positive electrode arrangements, i.e., a total of 64 batteries were assembled. Thereafter, these secondary batteries were subjected to aging and initial charge/discharge in the same manner as in Example 1.

The resultant nickel-hydrogen secondary batteries were divided into two groups each consisting of 32 batteries different in positive electrode arrangement. These two groups of the nickel-hydrogen secondary batteries were subjected to an operation, in which each battery was charged to a depth of 150% with an electricity quantity of 0.3 CmA and discharged with a cut of 1.0 CmA/1.0 V, repeatedly 20 times at a temperature of 20° C., thereby stabilizing the discharge capacity. Thereafter, the positive electrode swelling ratio of each secondary battery of one group was evaluated in the same fashion as in Example 1. The secondary batteries of the other group were charged to a depth of 150% with a current of 0.1 CmA at 20° C. and discharged with a cut of 1.0 CmA/1.0 V at a temperature of 20° C. The resultant discharge capacity was defined as the reference value of the charge quantity of the charge to 150% at a temperature of 20° C. with 0.1 CmA. Thereafter, the batteries were charged to a depth of 150% at a temperature of 45° C. with a current of 0.1 CmA and discharged with a cut of 1.0 CmA/1.0 V at 20° C. The ratio of the resultant discharge capacity to the above charge reference value was obtained and evaluated as a charge efficiency.

Figure 4:
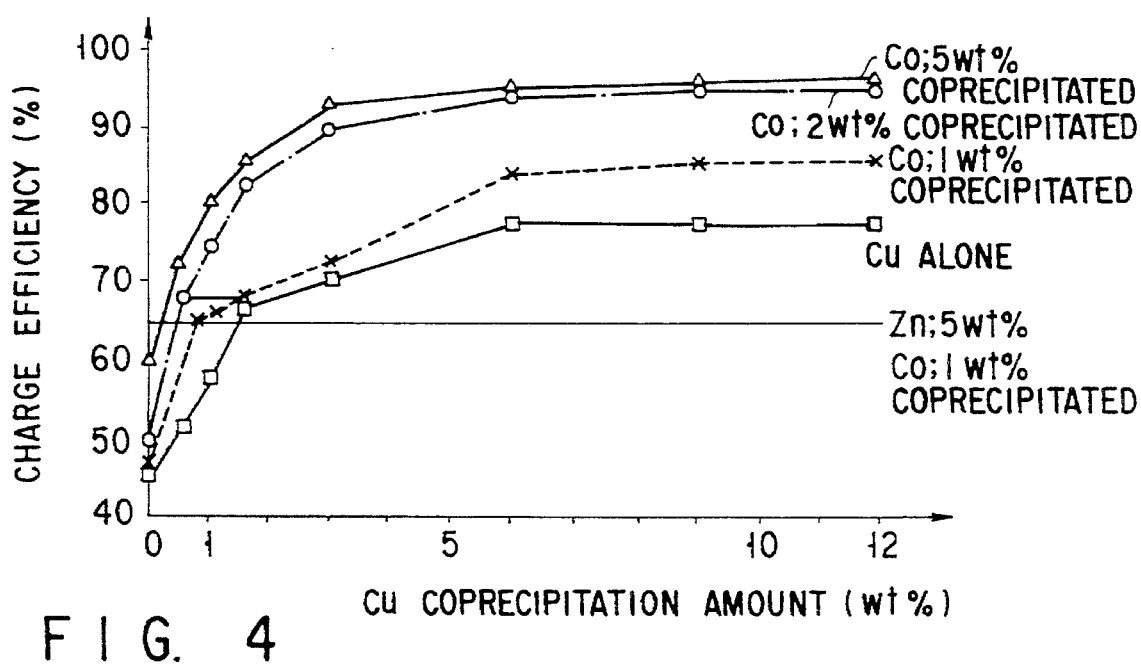
FIG. 4 is a graph showing the charge efficiency of each of nickel-hydrogen secondary batteries of Example 2 of the present invention.

The result of the charge efficiency and the result of the swelling ratio of the positive electrode caused by overcharge are shown in FIGS. 4 and 5, respectively. Note that FIG. 4 also shows, as a comparative example, the charge efficiency of a conventional cadmium-free positive electrode using nickel hydroxide grains, as an active material, in which cobalt and zinc were coprecipitated with metal nickel at ratios of 1 wt % and 5 wt %, respectively, with respect to nickel hydroxide.

As can bee seen from FIG. 4 showing the charge efficiency relationship, each secondary battery including the positive electrode containing, as an active material, the nickel hydroxide grains in which either cobalt and copper or only copper was coprecipirated was improved in charge efficiency compared to the comparative secondary battery including the positive electrode containing the cobalt-zinc coprecipitated nickel hydroxide grains as an active material. It is also apparent from FIG. 4 that in each type of the nickel hydroxide grains in which either cobalt and copper or only copper was coprecipitated, the charge efficiency rose as the coprecipitation amount of copper was increased, assumed a critical point when the copper precipitation amount ranged between 1.5 and 6 wt %, and reached saturation when it ranged between 6 and 9 wt %. In addition, each secondary battery including the positive electrode containing the cobalt-copper coprecipitated nickel hydroxide grains had a tendency in which the charge efficiency readily reached saturation in a region having a relatively small copper coprecipitation amount, compared to the secondary battery including the positive electrode containing the nickel hydroxide grains in which copper was singly coprecipitated. Especially in a region in which the copper coprecipitation amount was 3 wt % or less, there was a distinct difference in charge efficiency between the group in which the cobalt coprecipitation amounts were 0 and 1 wt % and the group in which they were 2 and 5 wt %. This means that in coprecipitation using the combination of cobalt and copper, the critical point of the cobalt coprecipitation amount with respect to the charge efficiency exists near 2 wt %. In other words, it is considered that the cobalt coprecipitation amount is preferably 1.5 wt % or more to improve the charge efficiency. However, if the cobalt coprecipitation amount exceeds 5 wt %, not only the charge efficiency saturates, but the purity of nickel hydroxide is degraded due to coprecipitation of transition metal elements other than nickel, and this reduces the capacity. Therefore, it is important to decrease the coprecipitation amount as small as possible to increase the capacity of the battery.

FIG. 4 also reveals that it is possible to obtain a secondary battery improved in charge efficiency by setting the coprecipitation amount of cobalt and copper or of only copper between 1.5 and 11 wt % in nickel hydroxide grains in which either cobalt and copper or only copper is coprecipitated.

As can be seen from FIG. 5 showing the swelling ratio of the positive electrode, in each positive electrode containing, as an active material, the nickel hydroxide grains in which either cobalt and copper or only copper was coprecipitated, the swelling ratio of the positive electrode decreased as the copper coprecipitation amount was increased, assumed a critical point when the copper coprecipitation amount ranged between 1.5 and 6 wt %, and reached saturation when it ranged between 6 and 9 wt %. In addition, in a region in which the copper coprecipitation amount was less than 0.5 wt %, the swelling ratio of the positive electrode containing the nickel hydroxide grains of the group in which the cobalt coprecipitation amounts were 2 and 5 wt % was higher than that of the positive electrode containing the nickel hydroxide grains of the group in which the cobalt coprecipitation amounts were 0 and 1 wt %. In a region in which the copper coprecipitation amount was 0.5 wt % or more, in contrast, the swelling ratio of the positive electrode containing the nickel hydroxide grains of the group in which the cobalt coprecipitation amounts were 2 and 5 wt % was lower than that of the positive electrode containing the nickel hydroxide grains of the group in which the cobalt coprecipitation amounts were 0 and 1 wt %. This is considered to be attributed to the difference in function between cobalt and copper; that is, cobalt allows easy occurrence of the charge reaction (the reaction of Formula 1 above) of nickel hydroxide, compared to copper, and copper has an effect of decreasing the swelling ratio of the positive electrode, compared to cobalt.

More specifically, in a region in which the coprecipitation amount of copper having the effect of decreasing the swelling ratio of the positive electrode is small, if a necessary amount (e.g., 2 or 5 wt %) of cobalt which readily causes the charge reaction is coprecipitated, overcharge is caused to produce a large amount of γ-NiOOH as a low-density, higher order oxide. This results in swelling of the positive electrode. If, however, the coprecipitation amount of copper is increased, the swelling of the positive electrode is discouraged, and this allows a uniform reaction throughout the nickel hydroxide grains in which 2 or 5 wt % of cobalt were coprecipitated. It is assumed that this decreases the swelling ratio of the positive electrode compared to the case in which the coprecipitation amount of cobalt is as small as 0 or 1 wt %. It is, therefore, obvious from FIG. 5 that a secondary battery improved in cycle characteristic can be obtained by reducing the swelling ratio of the positive electrode by setting the coprecipitation amount of copper and cobalt or of only copper between 1.5 and 11 wt % in nickel hydroxide grains in which either copper and cobalt or only copper is coprecipitated.

As discussed above, a positive electrode containing nickel hydroxide grains in which the coprecipitation amount of cobalt and copper or of only copper ranges from 1.5 to 11 wt % has an effect of decreasing the swelling ratio of the positive electrode. In addition, a secondary battery including this positive electrode has a high charge efficiency.

EXAMPLE 3

First, metal nickel (Ni), metal copper (Cu), and metal cobalt (Co) were dissolved in an aqueous sulfuric acid solution to prepare eight types of solutions in which a nickel complex ion, copper complex ion, and cobalt complex ion were produced. Subsequently, each of these solutions was dropped into an aqueous sodium hydroxide solution. In this neutralization process, the crystal growth rate was changed by convecting the aqueous sodium hydroxide solution and controlling the pH, the complex ion density, and the neutralization bath temperature, thereby manufacturing eight types of nickel hydroxide grains which had a spherical shape, a mean grain size of 10 μm, a tap density of 2.2 g/cm$^3$, and a specific surface area of 18.0 m$^2$/g, and in which cobalt and copper were coprecipitated with metal nickel at ratios of 1 wt % and 5 wt %, respectively, with respect to nickel hydroxide.

A half-width of a peak near 38.7° corresponding to a (101) plane in powder X-ray diffraction (2θ) was measured for each of four types of resultant cobalt-copper coprecipitated nickel hydroxide grains G, H, I, and J by using a powder X-ray diffraction analyzer (XD-3A (tradename) manufactured by Shimadzu Corp., the tube was Cu.Kα). Consequently, the half-widths of the grains G, H, I, and J were 0.4°, 0.6°, 0.8°, and 1.0°, respectively. A temperature at which nickel hydroxide was thermally decomposed into nickel hydroxide was measured for other four types of cobalt-copper coprecipitated nickel hydroxide grains K, L, M, and N by using a thermogravimetry device (SSC-5200, TG, type DTA-320 (tradename) manufactured by Seiko Denshi Kogyo K.K.). Consequently, the thermal decomposition temperatures of the grains K, L, M, and N were 260° C., 270° C., 280° C., and 290° C., respectively. FIG. 6 shows an example of the X-ray powder diffraction chart, and FIG. 7 shows an example of the thermogravimetry chart.

Following the same procedures as in Example 1 except that the nickel hydroxide grains described above were used, nickel-hydrogen secondary batteries having the structure shown in FIG. 1 were assembled and subjected to aging and initial charge/discharge. Thereafter, evaluation of the cycle (utilization) was performed.

Figure 8:
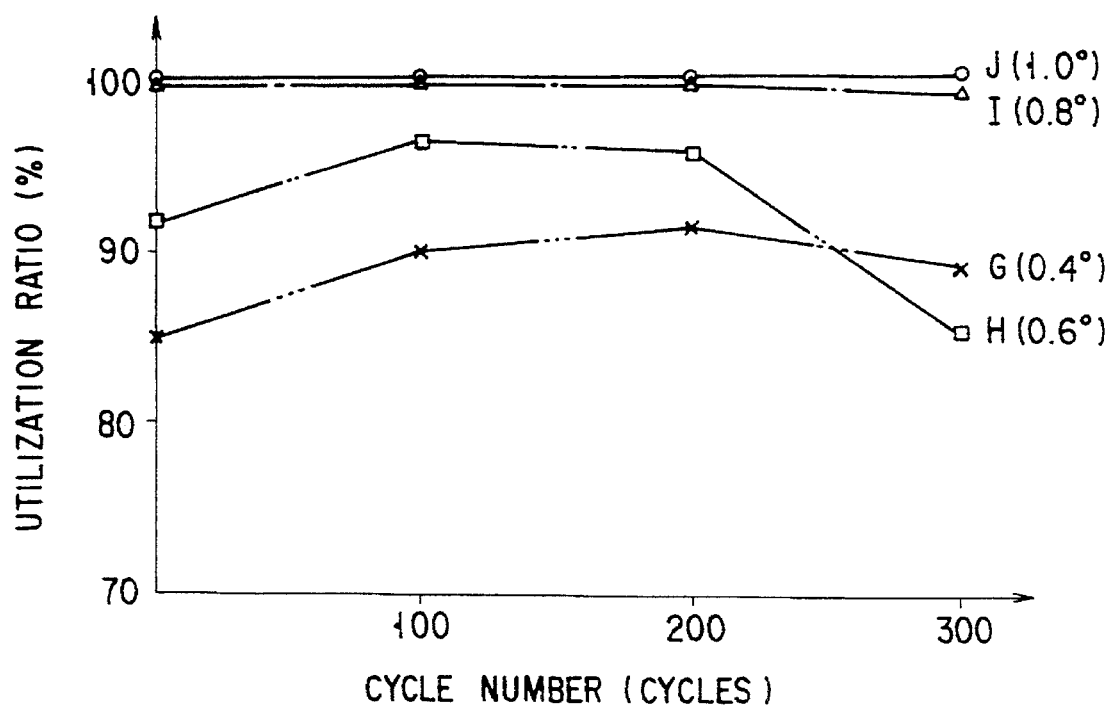
FIG. 8 is a graph showing the relationship between the cycle number and the utilization ratio of each of nickel-hydrogen secondary batteries of Example 3 of the present invention.
Figure 9:
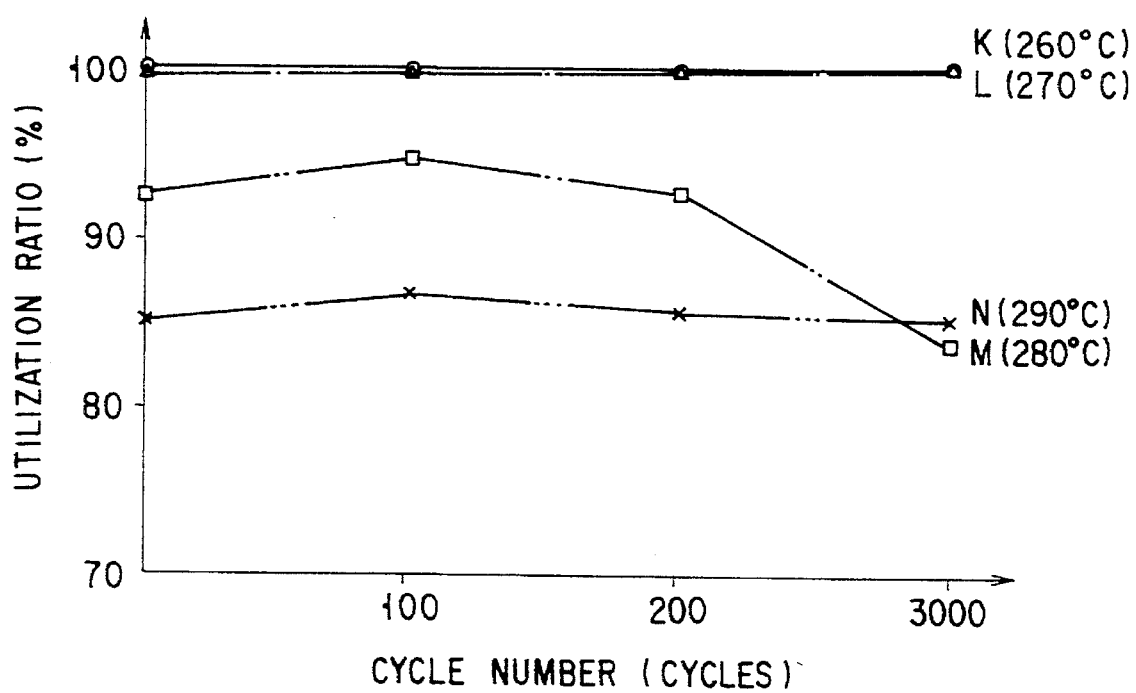
FIG. 9 is a graph showing the relationship between the cycle number and the utilization ratio of each of nickel-hydrogen secondary batteries of Example 4 of the present invention.

FIG. 8 shows the results of the utilization ratios of secondary batteries including positive electrodes containing the four types of the cobalt-copper coprecipitated nickel hydroxide grains G, H, I, and J as active materials. FIG. 9 shows the results of the utilization ratios of secondary batteries including positive electrodes containing the four types of the cobalt-copper coprecipitated nickel hydroxide grains K, L, M, and N as active materials. Referring to FIG. 8, the values given in the parenthesis after symbols G, H, I, and J indicate half-widths. Referring to FIG. 9, the values given in the parenthesis after symbols K, L, M, and N indicate thermal decomposition temperatures.

As is apparent from FIG. 8, the cobalt-copper coprecipitated nickel hydroxide grains I and J in each of which the half-width of a (101) plane as measured by powder X-ray diffraction (2θ) was 0.8° or more were good grains since the utilization ratio of nickel hydroxide decreased little with an increase in cycle number. In addition, as can bee seen from FIG. 9, the cobalt-copper coprecipitated nickel hydroxide grains K and L each having a thermal decomposition temperature of 270° C. or less were good grains since the utilization ratio decreased little with an increase in cycle number.

This can be related to the degree of proton diffusion in nickel hydroxide grains as has been discussed above. The half-width measured by powder X-ray diffraction is an index concerning crystal strain of nickel hydroxide grains, and the thermal decomposition temperature measured by thermogravimetry is an index related to bonding energy; that is, the two are entirely different from each other. It is, however, estimated that proton diffusion can be caused smoothly by straining the crystal structure to some extent and decreasing bonding energy to a certain degree. The utilization ratio of a positive electrode containing nickel hydroxide grains in which proton diffusion does not occur smoothly, as an active material, is low from initial periods. Although the utilization ratio rises as the cycle number increases since the proton diffusion is promoted, a partial overcharge phenomenon readily takes place because polarization tends to increase. Consequently, cycle degradation occurs relatively earlier. One cause of this early occurrence of cycle degradation is the balance of durability with respect to smoothness of proton diffusion and swelling and shrinkage of nickel hydroxide caused by charge.

For these reasons, it is possible to realize an alkali secondary battery with a high utilization ratio and a good cycle characteristic by using, as a positive electrode active material, cobalt-copper coprecipitated nickel hydroxide grains whose half-width of a (101) plane as measured by powder X-ray diffraction (2θ) is 0.8° or more, or cobalt-copper coprecipitated nickel hydroxide grains whose thermal decomposition temperature as measured by thermogravimetry is 270° C. or less.

EXAMPLE 4

First, metal nickel (Ni), metal bismuth (hi), and metal cobalt (Co) were dissolved in an aqueous sulfuric acid solution to prepare a solution in which a nickel complex ion, bismuth complex ion, and cobalt complex ion were produced. Subsequently, the resultant solution was dropped into an aqueous sodium hydroxide solution. In this neutralization process, the crystal growth rate was changed by convecting the aqueous sodium hydroxide solution and controlling the pH, the complex ion density, and the neutralization bath temperature, thereby manufacturing nickel hydroxide grains which had a spherical shape, a mean grain size of 10 μm, a tap density of 2.0 g/cm$^3$, and a specific surface area of 15 m$^2$/g, and in which metal cobalt and metal bismuth were coprecipitated with metal nickel at ratios of 2 wt % and 5 wt %, respectively, with respect to nickel hydroxide.

A half-width of a diffraction peak in a (101) plane in powder X-ray diffraction (2θ) was measured for the resultant cobalt-bismuth coprecipitated nickel grains. Consequently, the half-width of the nickel hydroxide grains was 1.0°.

Following the same procedures as in Example 1, the above positive electrode was accommodated together with a negative electrode and a separator in a case, and an alkali electrolyte was also contained in the case. In this fashion, nickel-hydrogen secondary batteries having the structure as in FIG. 1 were assembled by further using members such as metal covers. In this assembling step, three secondary batteries having the same positive electrode arrangement were assembled. Thereafter, aging and initial charge/discharge were performed for these secondary batteries in the same manner as in Example 1.

Of the three nickel-hydrogen secondary batteries thus assembled, the first secondary battery was subjected to charge/discharge, in which the battery was charged to a depth of 150% with an electricity quantity of 0.3 CmA and discharged with a cut of 1.0 CmA/1.0 V, repeatedly 300 times, and the utilization ratio of the positive electrode was measured.

The second secondary battery was subjected to an operation in which the battery was charged to a depth of 150% with an electricity quantity of 0.3 CmA and discharged with a cut of 1.0 CmA/1.0 V, repeatedly 20 times at a temperature of 20° C., thereby stabilizing the charge capacity. Thereafter, the positive electrode swelling ratio of the battery was evaluated in the same way as in Example 1.

The third secondary battery was charged to a depth of 150% with a current of 0.1 CmA at 20° C. and discharged with a cut of 1.0 CmA/1.0 V at a temperature of 20° C. The resultant discharge capacity was defined as the reference value of the charge quantity of the charge to 150% at a temperature of 20° C. with 0.1 CmA. Thereafter, the battery was charged to a depth of 150% at a temperature of 45° C. with a current of 0.1 CmA and discharged with a cut of 1.0 CmA/1.0 V at 20° C. The ratio of the resultant discharge capacity to the above charge reference value was obtained and evaluated as a charge efficiency.

Consequently, the secondary batteries of Example 4 were found to have very excellent characteristics, i.e., a positive electrode utilization ratio of about 97% even after 300 cycles, a positive electrode swelling ratio of about 100% in overcharge, and a charge efficiency of about 90%.

In Examples 1 to 4 discussed above, Cu or a combination of Co and Cu or Co and Bi was used as metals to be coprecipitated with metal Ni of nickel hydroxide grains. However, the present invention could also achieve effects similar to those of Examples 1 to 4 by using nickel hydroxide grains in which Co and at least one type of a transition metal selected from the group consisting of Cr, Ga, In, La, Sc, and Y were coprecipitated with metal Ni, or by using nickel hydroxide grains in which either Bi or In was coprecipitated with metal Ni.

As has been described above, the present invention can provide a high-performance, alkali secondary battery including a cadmium-free positive electrode and capable of decreasing the positive electrode swelling ratio in overcharge and increasing the charge efficiency at high temperatures.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An alkali secondary battery, comprising:
   (a) a positive electrode accommodated in a case and having a structure in which a paste containing nickel hydroxide grains, a conductor, and a binder is filled in a metal porous body;
   (b) a negative electrode accommodated in said case and so arranged as to oppose said positive electrode with a separator sandwiched therebetween; and
   (c) an alkali electrolyte contained in said case;
   wherein said nickel hydroxide grains have a structure in which cobalt and copper are substituted for some of the nickel atoms contained in said nickel hydroxide, the total amount of substitution being 1.5 to 11.0% by weight based on the amount of nickel hydroxide, to form nickel-cobalt-copper solid solution.

2. The secondary battery according to claim 1, wherein said cobalt and said copper are substituted for some of the nickel atoms containing said nickel hydroxide, the total amount of substitution being 3.0 to 8.0% by weight based on the amount of nickel hydroxide.

3. The secondary battery according to claim 1, wherein said nickel hydroxide grains have a mean grain size of 5 to 30 μm and a tap density of not less than 1.8 g/cm$^3$.

4. The secondary battery according to claim 1, wherein said nickel hydroxide grains have a specific surface area of 8 to 25 m$^2$/g.

5. The secondary battery according to claim 1, wherein said nickel hydroxide grains have a half-width of a peak in a (101) plane of not less than 0.8° in powder X-ray diffraction (2θ).

6. The secondary battery according to claim 1, wherein said nickel hydroxide grains have a thermal decomposition temperature of 270° C. or lower in thermogravimetry.

7. The secondary battery according to claim 1, wherein said conductor is at least one material selected from the group consisting of metal cobalt, cobalt hydroxide, and cobalt monoxide.

8. The secondary battery according to claim 1, wherein said metal porous body is a foamed metal.

9. The secondary battery according to claim 1, wherein said negative electrode contains a hydrogen-absorbing alloy powder which absorbs and releases hydrogen.

10. An alkali secondary battery, comprising:
    (a) a positive electrode accommodated in the case in having a structure in which a paste containing nickel hydroxide grains, a conductor, and a binder is filled in the metal porous body;
    (b) a negative electrode accommodated in said case and so arranged as to oppose to said positive electrode with a separator sandwiched therebetween; and
    (c) an alkali electrolyte contained in said case;
    wherein said nickel hydroxide grains have a structure in which copper is substituted for some of the nickel atoms contained in said nickel hydroxide in an amount of 1.5 to 11.0% by weight based on the amount of nickel hydroxide, to form a nickel-copper solid solution.

11. The secondary battery according to claim 10, wherein said copper is substituted for some of the nickel atoms containing said nickel hydroxide in amount of 3.0 to 6.0% by weight based on the amount of nickel hydroxide.

12. The secondary battery according to claim 10, wherein said nickel hydroxide grains have a mean grain size of 5 to 30 μm and a tap density of not less than 1.8 g/cm$^3$.

13. The secondary battery according to claim 10, wherein said nickel hydroxide grains have a specific surface area of 8 to 25 m$^2$/g.

14. The secondary battery according to claim 10, wherein said nickel hydroxide grains have a half-width of a peak in a (101) plane of not less than 0.8° in X-ray diffraction (2θ).

15. The secondary battery according to claim 10, wherein said nickel hydroxide grains have a thermal decomposition temperature of 270° C. or lower in thermogravimetry.

16. The secondary battery according to claim 10, wherein said conductor is at least one material selected from the group consisting of metal cobalt, cobalt hydroxide, and cobalt monoxide.

17. The secondary battery according to claim 10, wherein said metal porous body is a foamed metal.

18. The secondary battery according to claim 10, wherein said negative electrode contains a hydrogen-absorbing alloy powder which absorbs and releases hydrogen.

19. The secondary battery according to claim 16, wherein said cobalt and said copper are substituted for some of the nickel atoms contained in said nickel hydroxide in an amount of 1.5 to 5.0% by weight and 1.5 to 6.0% by weight, respectively, based on the amount of nickel hydroxide.

\* \* \* \* \*